(12) United States Patent
Yamamoto (10) Patent No.: US 9,787,245 B2
(45) Date of Patent: Oct. 10, 2017

(54) MOTOR CONTROL APPARATUS HAVING PROTECTION OPERATION UNIT, AND MACHINE LEARNING APPARATUS AND METHOD THEREOF

(71) Applicant: FANUC Corporation, Yamanashi (JP)

(72) Inventor: Kenta Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/042,745

(22) Filed: Feb. 12, 2016

(65) Prior Publication Data
US 2017/0033726 A1    Feb. 2, 2017

(30) Foreign Application Priority Data
Jul. 31, 2015   (JP) .................. 2015-152006

(51) Int. Cl.
*H02P 1/00* (2006.01)
*H02P 3/00* (2006.01)
(Continued)

(52) U.S. Cl.
CPC ......... *H02P 29/028* (2013.01); *G06N 99/005* (2013.01); *H02H 3/00* (2013.01); *H02P 27/06* (2013.01); *H02P 29/032* (2016.02)

(58) Field of Classification Search
CPC .................. H02M 1/32; H02M 5/4585; H02M 2001/007; H02M 3/158; H02M 7/53873; H02M 1/4225; H02M 2001/0022; H02M 2001/0051; H02M 2001/325; H02M 2003/1586; H02M 3/156; H02M 3/1584; H02M 5/458; H02M 7/066
(Continued)

(56) References Cited

U.S. PATENT DOCUMENTS 4,503,940 A * 3/1985 Watanabe .................. H02P 3/18
                                                            187/290
4,666,020 A * 5/1987 Watanabe .................. B66B 5/02
                                                            187/290
(Continued)

FOREIGN PATENT DOCUMENTS

CN      103326635 A    9/2013
JP      2006-14546 A   1/2006
(Continued)

*Primary Examiner* — Paul Ip
(74) *Attorney, Agent, or Firm* — Hauptman Ham, LLP (57) ABSTRACT

A machine learning apparatus learns conditions associated with power failure on the side of an AC power supply in a motor control apparatus which converts AC power into DC power, outputs the DC power to a DC link, further converts the DC power into AC power for driving a motor, and supplies the AC power to the motor, includes a state observation unit which observes a state variable including at least one of data associated with the value of a power supply voltage on the AC power supply side, data associated with the amount of energy stored in a DC link capacitor provided in the DC link, and data indicating whether a protective operation for the motor control apparatus is successful, and a learning unit which learns conditions associated with power failure on the AC power supply side in accordance with a training data set defined by the state variable.

8 Claims, 5 Drawing Sheets

(51) Int. Cl.
*H02P 29/028* (2016.01)
*G06N 99/00* (2010.01)
*H02P 27/06* (2006.01)
*H02H 3/00* (2006.01)
*H02P 29/032* (2016.01)

(58) Field of Classification Search
USPC ........ 318/445, 400.21, 400.3, 376; 187/290; 363/37
See application file for complete search history.

(56) References Cited

U.S. PATENT DOCUMENTS

| | | | | | |
|---|---|---|---|---|---|
| 4,678,063 | A | * | 7/1987 | Kitaoka | B66B 1/30 187/296 |
| 5,070,290 | A | * | 12/1991 | Iwasa | H02P 23/06 187/288 |
| 6,043,999 | A | * | 3/2000 | Ehrenberg | H02J 3/1828 363/125 |
| 6,315,081 | B1 | * | 11/2001 | Yeo | B66B 5/02 187/290 |
| 6,603,672 | B1 | * | 8/2003 | Deng | H02J 7/345 363/37 |
| 6,813,525 | B2 | * | 11/2004 | Reid | G06Q 10/087 700/19 |
| 6,845,020 | B2 | * | 1/2005 | Deng | H02J 7/345 363/37 |
| 7,400,104 | B2 | * | 7/2008 | Sato | B60L 11/12 318/376 |
| 7,567,047 | B2 | * | 7/2009 | Rozman | H02P 21/05 180/412 |
| 7,882,937 | B2 | * | 2/2011 | Okada | B66B 1/308 187/293 |
| 8,030,878 | B2 | * | 10/2011 | Iwashita | G01R 31/42 318/779 |
| 2002/0010518 | A1 | * | 1/2002 | Reid | G06Q 10/087 700/31 |
| 2003/0204777 | A1 | * | 10/2003 | Kojori | G05B 23/0289 714/14 |
| 2004/0027839 | A1 | * | 2/2004 | Deng | H02J 7/345 363/37 |
| 2005/0281680 | A1 | * | 12/2005 | Schulz | E21B 41/0021 417/44.11 |
| 2005/0281681 | A1 | * | 12/2005 | Anderson | E21B 41/0021 417/44.11 |
| 2005/0283277 | A1 | * | 12/2005 | Schulz | E21B 41/0021 700/282 |
| 2006/0001393 | A1 | * | 1/2006 | Rozman | H02P 21/05 318/400.21 |
| 2006/0113954 | A1 | * | 6/2006 | Ma | H02P 21/0089 318/803 |
| 2006/0156096 | A1 | * | 7/2006 | Sato | B60L 11/12 714/724 |
| 2007/0176570 | A1 | * | 8/2007 | Bokusky | H02P 29/032 318/466 |
| 2009/0058333 | A1 | * | 3/2009 | Okada | B66B 1/308 318/380 |
| 2010/0044160 | A1 | * | 2/2010 | Agirman | B66B 5/027 187/290 |
| 2010/0169030 | A1 | * | 7/2010 | Parlos | G01H 1/00 702/58 |
| 2011/0125436 | A1 | * | 5/2011 | Watanabe | G01R 31/3679 702/65 |
| 2011/0182398 | A1 | * | 7/2011 | Iwashita | G01R 31/42 377/19 |
| 2012/0261217 | A1 | * | 10/2012 | Agirman | B66B 5/027 187/290 |
| 2013/0094258 | A1 | * | 4/2013 | Royak | H02M 1/32 363/89 |
| 2013/0134910 | A1 | * | 5/2013 | Iwashita | H02P 3/14 318/376 |
| 2013/0169204 | A1 | * | 7/2013 | Kuboe | H02M 5/458 318/400.3 |
| 2013/0271048 | A1 | * | 10/2013 | Iwashita | H02P 21/0046 318/400.02 |
| 2013/0282313 | A1 | * | 10/2013 | Wank | G01R 31/42 702/58 |
| 2013/0334896 | A1 | * | 12/2013 | Yamamoto | B60L 11/182 307/104 |
| 2013/0342013 | A1 | * | 12/2013 | Masuda | H02P 1/00 307/29 |
| 2013/0342139 | A1 | * | 12/2013 | Shimomugi | H02M 7/066 318/400.3 |
| 2013/0342149 | A1 | * | 12/2013 | Masuda | H02P 3/02 318/479 |
| 2014/0021888 | A1 | * | 1/2014 | Niwa | H02P 27/00 318/139 |
| 2014/0210389 | A1 | * | 7/2014 | Niwa | H02P 3/12 318/400.3 |
| 2014/0306640 | A1 | * | 10/2014 | Yamamoto | H02P 27/08 318/504 |

FOREIGN PATENT DOCUMENTS

| | | |
|---|---|---|
| JP | 2011-50119 A | 3/2011 |
| JP | 2013-126346 A | 6/2013 |

* cited by examiner

MOTOR CONTROL APPARATUS HAVING PROTECTION OPERATION UNIT, AND MACHINE LEARNING APPARATUS AND METHOD THEREOF

RELATED APPLICATIONS

The present application claims priority to Japanese Patent Application Number 2015-152006, filed Jul. 31, 2015.

BACKGROUND OF THE INVENTION

1. Field of the Invention

The present invention relates to a motor control apparatus which converts AC power supplied from the AC input side into DC power, outputs the DC power to a DC link, further converts the DC power into AC power for driving a motor, and supplies the AC power to the motor, and a machine learning apparatus and method used for the motor control apparatus. More particularly, the present invention relates to a motor control apparatus including a protective operation control unit which instructs a motor to perform a predetermined protective operation upon power failure on the three-phase AC input side, and a machine learning apparatus and method used for the motor control apparatus.

2. Description of the Related Art

In a motor control apparatus which drives motors within a machine tool, a forging machine, an injection molding machine, an industrial machine, or various robots, AC power supplied from the three-phase AC input side is temporarily converted by a rectifier into DC power, which is further converted into AC power by an inverter. The AC power is used as drive power for a motor provided for each drive axis.

In such a motor control apparatus, when power failure occurs on the three-phase AC input side of the rectifier and the three-phase AC input voltage drops, it is no longer possible for the motor to continue normal operation. This may cause some type of trouble such as damage or deformation of, e.g., a motor, the motor control apparatus that drives the motor, a tool connected to the motor driven by the motor control apparatus, an object to be processed by the tool, or a manufacturing line including the motor control apparatus. Therefore, a power failure detection unit may be preferably set on the three-phase AC input side of the rectifier to monitor whether power failure has occurred on the three-phase AC input side of the rectifier. When the power failure detection unit determines that power failure has occurred on the three-phase AC input side of the rectifier, the motor control apparatus may preferably perform a protective operation for avoiding or minimizing the above-mentioned failure.

As a power failure detection method, as disclosed in, e.g., Japanese Laid-open Patent Publication No. 2006-14546, the three-phase AC input voltage on the AC power supply side of the rectifier is transformed by a coordinate transformation into an equivalent voltage vector on the two-phase coordinate system, and the amplitude of the vector is calculated to, in turn, calculate the amplitude value of the power supply voltage. When the amplitude value has been lower than a predetermined reference voltage value for a predetermined reference time, power failure is determined to be detected.

Figure 7:
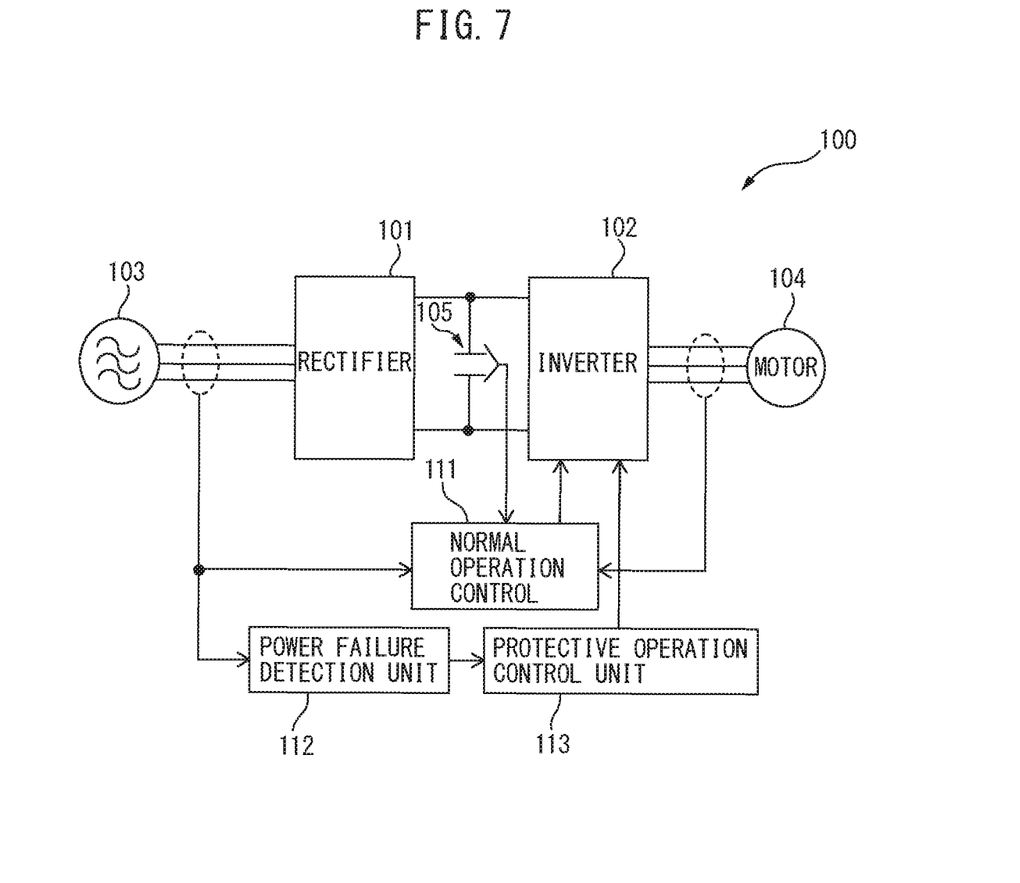
FIG. 7 is a block diagram illustrating a general motor control apparatus which performs a protective operation upon power failure.

FIG. 7 is a block diagram illustrating a general motor control apparatus which performs a protective operation upon power failure. For the sake of illustrative simplicity, FIG. 7 illustrates driving of only one motor 104. A motor control apparatus 100 includes a rectifier 101 which converts AC power from a commercial three-phase AC power supply (to be simply referred to as an "AC power supply" hereinafter) 103 into DC power, an inverter 102 which is connected to a DC link (Direct-Current link) on the DC side of the rectifier 101, converts DC power output from the rectifier 101 into AC power having desired frequencies and supplied as drive power for the motor 104 or converts AC power regenerated from the motor 104 into DC power, and a DC link capacitor 105 is provided in the DC link and has a storage function for storing DC power and a smoothing function for suppressing pulsation of the DC output of the rectifier 101. The motor control apparatus 100 includes, as its control system, a normal operation control unit 111, a power failure detection unit 112, and a protective operation control unit 113. The normal operation control unit 111 controls, the inverter 102 to output AC power having desired voltages and frequencies for driving the motor 104 or convert AC regenerative power produced by the motor 104 into DC power, based on the AC current supplied from the inverter 102 to the motor 104, the DC voltage applied across the two terminals of the DC link capacitor 105 (to be simply referred to as a "DC link voltage" hereinafter), and the AC current supplied from the AC power supply 103 to the rectifier 101. The power failure detection unit 112 detects whether power failure has occurred, based on the power supply voltage on the AC power supply side of the rectifier 101. The protective operation control unit 113 sends a protective operation command to the inverter 102 to cause the motor control apparatus 100 to perform a protective operation when the power failure detection unit 112 detects that power failure has occurred. In response to the protective operation command, the inverter 102 converts the DC power stored in the DC link capacitor 105 into AC power preferably used for various protective operations for protecting, e.g., a tool connected to the motor 104, an object to be processed by the tool, and a manufacturing line including the motor control apparatus 100, and outputs the AC power.

A protective operation upon power failure advantageously allows protection of, e.g., a motor, a motor control apparatus, a tool, an object to be processed, and a manufacturing line including the motor control apparatus, but, once performed, it involves the stop of the manufacturing line and causes an economic loss. Therefore, upon power failure, the motor control apparatus and its peripheral devices (e.g., a control power supply unit and a coolant device) are preferably allowed to continue normal operation for a certain time, using energy stored in the DC link capacitor, to limit the execution of a protective operation to a preferable minimum time.

SUMMARY OF INVENTION

In consideration of the above-described problem, it is an object of the present invention to provide a motor control apparatus which can maximally continue normal operation upon power failure on the AC power supply side to minimize the execution of a protective operation, and a machine learning apparatus and method used for the motor control apparatus.

In order to realize the above-described object, a machine learning apparatus which learns a condition associated with power failure on the side of an AC power supply in a motor control apparatus which converts AC power supplied from the AC power supply into DC power, outputs the DC power to a DC link, further converts the DC power into AC power for driving a motor, and supplies the AC power to the motor, includes a state observation unit which observes a state variable including at least one of data associated with the value of a power supply voltage on the AC power supply side, data associated with the amount of energy stored in a DC link capacitor provided in the DC link, data indicating whether a protective operation for the motor control apparatus is successful, and data associated with motor output, and a learning unit which learns a condition associated with power failure on the AC power supply side in accordance with a training data set defined by the state variable.

The learning unit may include a reward computation unit which computes a reward based on the state variable, and a function update unit updates, based on the reward, a function for changing a power failure detection level representing the value of a power supply voltage defined as a criterion for determination as to whether power failure has occurred on the AC power supply side, and a power failure detection time representing the time for which the power supply voltage on the AC power supply side has been lower than the power failure detection level.

The reward computation unit may increase the reward when the amount of energy stored in the DC link capacitor and observed by the state observation unit is smaller than a predetermined value, and the reward computation unit may reduce the reward when the amount of energy stored in the DC link capacitor and observed by the state observation unit is equal to or larger than the predetermined value.

The reward computation unit may reduce the reward when failure of the protective operation for the motor control apparatus is observed by the state observation unit.

The learning unit may be configured to learn the condition in accordance with the training data set obtained for each of a plurality of motor control apparatuses.

A motor control apparatus including the above-described machine learning apparatus further includes a decision-making unit which decides the power failure detection level and the power failure detection time in response to input of the current state variable, based on the result of learning by the learning unit in accordance with the training data set, a rectifier which converts AC power supplied from the AC power supply into DC power and outputs the DC power to the DC link, an inverter which is connected to the DC link, converts the DC power in the DC link into AC power, and supplies the AC power to the motor, a power failure detection unit which determines that power failure has occurred on the AC power supply side when the power supply voltage on the AC power supply side has been lower than the power failure detection level for the power failure detection time, and a protective operation control unit outputs a protective operation command to the inverter to output power for performing a predetermined protective operation by the motor, when the power failure detection unit detects power failure on the AC power supply side.

The learning unit may be configured to re-learn and update the condition in accordance with an additional training data set defined by the current state variable.

A machine learning method for learning a condition associated with power failure on the side of an AC power supply in a motor control apparatus which converts AC power supplied from the AC power supply into DC power, outputs the DC power to a DC link, further converts the DC power into AC power for driving a motor, and supplies the AC power to the motor, includes a state observation step of observing a state variable including at least one of data associated with the value of a power supply voltage on the AC power supply side, data associated with the amount of energy stored in a DC link capacitor provided in the DC link, and data indicating whether a protective operation for the motor control apparatus is successful, and a learning step of learning a condition associated with power failure on the AC power supply side in accordance with a training data set defined by the state variable.

BRIEF DESCRIPTION OF THE DRAWINGS

The present invention will be more clearly understood by reference to the accompanying drawings, in which.

DETAILED DESCRIPTION

A motor control apparatus including a protective operation control unit, and a machine learning apparatus and method will be described below with reference to the drawings. However, it should be understood that the present invention is limited to neither the drawings nor the following embodiment.

Figure 1:
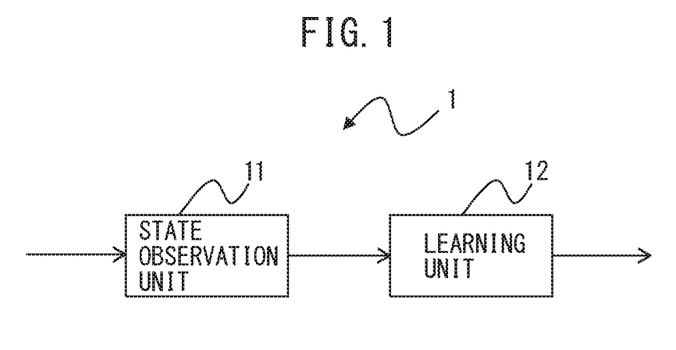
FIG. 1 is a principle block diagram illustrating a machine learning apparatus according to an embodiment.

FIG. 1 is a principle block diagram illustrating a machine learning apparatus according to an embodiment. The same reference numerals in different drawings denote components having the same functions hereinafter.

A machine learning apparatus 1 according to the embodiment is configured to learn conditions associated with power failure on the side of an AC power supply in a motor control apparatus which converts AC power supplied from the AC power supply into DC power, outputs the DC power to a DC link, further converts the DC power into AC power for driving a motor, and supplies the AC power to the motor. In other words, the machine learning apparatus 1 learns a power failure detection level and a power failure detection time as conditions which are associated with power failure on the AC power supply side and can maximally continue normal operation upon power failure on the AC power supply side of the motor control apparatus to minimize the execution of a protective operation. The power failure detection level means the value of a power supply voltage defined as a criterion for determination as to whether power failure has occurred on the AC power supply side of the motor control apparatus. The power failure detection time means the time for which the power supply voltage on the AC power supply side of the motor control apparatus has been lower than the power failure detection level. When the power supply voltage on the AC power supply side has been lower than the power failure detection level for the power failure detection time, it is determined that "power failure has occurred on the AC power supply side."

The machine learning apparatus 1 includes a state observation unit 11 and a learning unit 12.

The state observation unit 11 observes, as a training data set, a state variable including at least one of data associated with the value of a power supply voltage on the AC power supply side, data associated with the amount of energy stored in a DC link capacitor provided in the DC link, data indicating whether a protective operation for the motor control apparatus is successful, and data associated with motor output.

The learning unit 12 learns a power failure detection level and a power failure detection time as conditions associated with power failure on the AC power supply side in accordance with a training data set defined by the state variable. Training data sets may be obtained from a plurality of motor control apparatuses. In this case, the learning unit 12 learns conditions associated with a power failure in accordance with the training data sets obtained for the plurality of motor control apparatuses.

Figure 2:
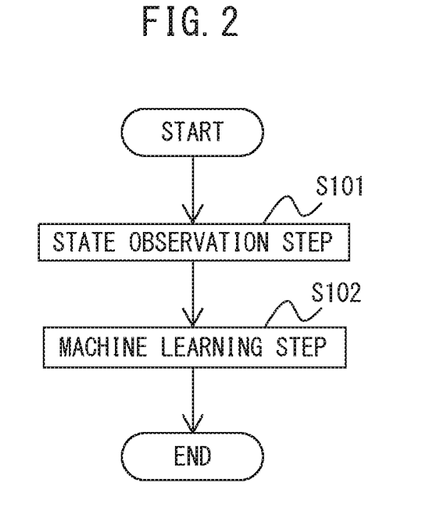
FIG. 2 is a flowchart illustrating the operation principle of a machine learning method according to the embodiment.

FIG. 2 is a flowchart illustrating the operation principle of a machine learning method according to the embodiment. A machine learning method for learning conditions associated with power failure on the side of an AC power supply in a motor control apparatus which converts AC power supplied from the AC power supply into DC power, outputs the DC power to a DC link, further converts the DC power into AC power for driving a motor, and supplies the AC power to the motor includes state observation step S101 and machine learning step S102.

State observation step S101 is executed by the state observation unit 11. In other words, the state observation unit 11 observes a state variable including at least one of data associated with the value of a power supply voltage on the AC power supply side, data associated with the amount of energy stored in a DC link capacitor provided in the DC link, data indicating whether a protective operation for the motor control apparatus is successful, and data associated with motor output.

Machine learning step S102 is executed by the learning unit 12, which learns conditions associated with power failure on the AC power supply side in accordance with a training data set defined by the state variable.

The learning unit 12 may employ any type of learning algorithm. The application of reinforcement learning will be taken as an example below. In reinforcement learning, the agent (the subject of an action) in a given environment observes the current state to decide an action to be taken. The agent selects an action to receive a reward from the environment, thereby learning a measure which achieves the greatest reward through a series of actions. As typical methods for reinforcement learning, Q-learning and TD-learning are known. In, e.g., Q-learning, the general update expression (action value table) for an action value function Q(s, a) is given by:

$$Q(s_t, a_t) \leftarrow Q(s_t, a_t) + \alpha \left( r_{t+1} + \gamma \max_a Q(s_{t+1}, a) - Q(s_t, a_t) \right) \quad (1)$$

where $s_t$ is the environment at time t and $a_t$ is the action at time t. Upon the action $a_t$, the environment changes to $s_{t+1}$. $r_{t+1}$ is the reward received upon a change in environment, $\gamma$ is the discount factor, and $\alpha$ is the learning factor. When Q-learning is adopted, the power failure detection level and the power failure detection time are defined as actions $a_t$.

Figure 3:
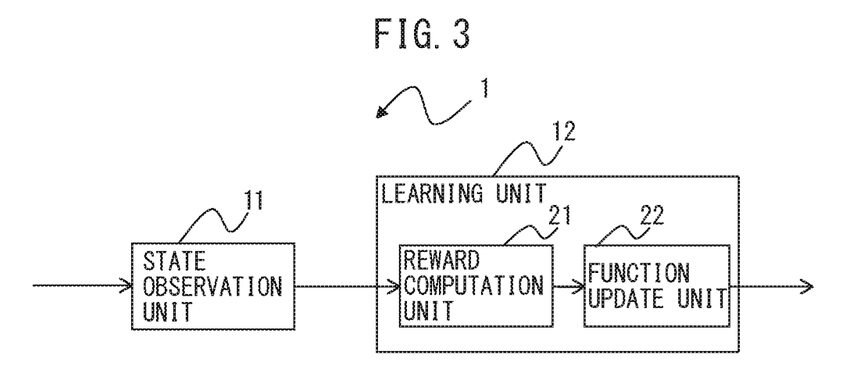
FIG. 3 is a principle block diagram illustrating a machine learning apparatus using reinforcement learning according to the embodiment.

FIG. 3 is a principle block diagram illustrating a machine learning apparatus using reinforcement learning according to the embodiment. The learning unit 12 includes a reward computation unit 21 and a function update unit 22. The reward computation unit 21 computes a reward based on the state variable. The function update unit 22 updates, based on the reward, a function for changing a power failure detection level representing the value of a power supply voltage defined as a criterion for determination as to whether power failure has occurred on the AC power supply side, and a power failure detection time representing the time for which the power supply voltage on the AC power supply side has been lower than the power failure detection level. In, e.g., Q-learning, the action value function Q(s, a) presented in expression (1) is used as a function for changing the power failure detection level and the power failure detection time defined as actions $a_t$. Since other circuit components are the same as those illustrated as FIG. 1, the same reference numerals denote the same circuit components, and a detailed description thereof will not be given.

Figure 4:
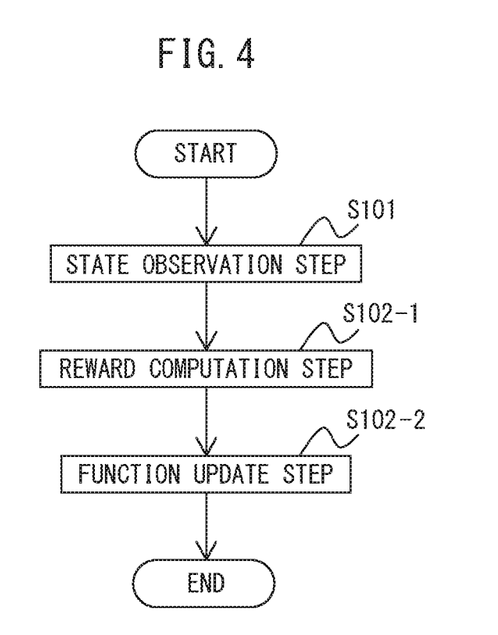
FIG. 4 is a flowchart illustrating the principle of a machine learning method using reinforcement learning according to the embodiment.

FIG. 4 is a flowchart illustrating the principle of a machine learning method using reinforcement learning according to the embodiment.

First, in state observation step S101, the state observation unit 11 observes a state variable including at least one of data associated with the value of a power supply voltage on the AC power supply side, data associated with the amount of energy stored in a DC link capacitor provided in the DC link, data indicating whether a protective operation for the motor control apparatus is successful, and data associated with motor output.

In reward computation step S102-1, the reward computation unit 21 computes a reward based on the state variable observed in step S101.

In function update step S102-2, the function update unit 22 updates, based on the reward, a function for changing a power failure detection level representing the value of a power supply voltage defined as a criterion for determination as to whether power failure has occurred on the AC power supply side, and a power failure detection time representing the time for which the power supply voltage on the AC power supply side has been lower than the power failure detection level.

A motor control apparatus including the above-mentioned machine learning apparatus will be described next. The use of reinforcement learning as a learning algorithm for a learning unit will be taken as an example herein.

Figure 5:
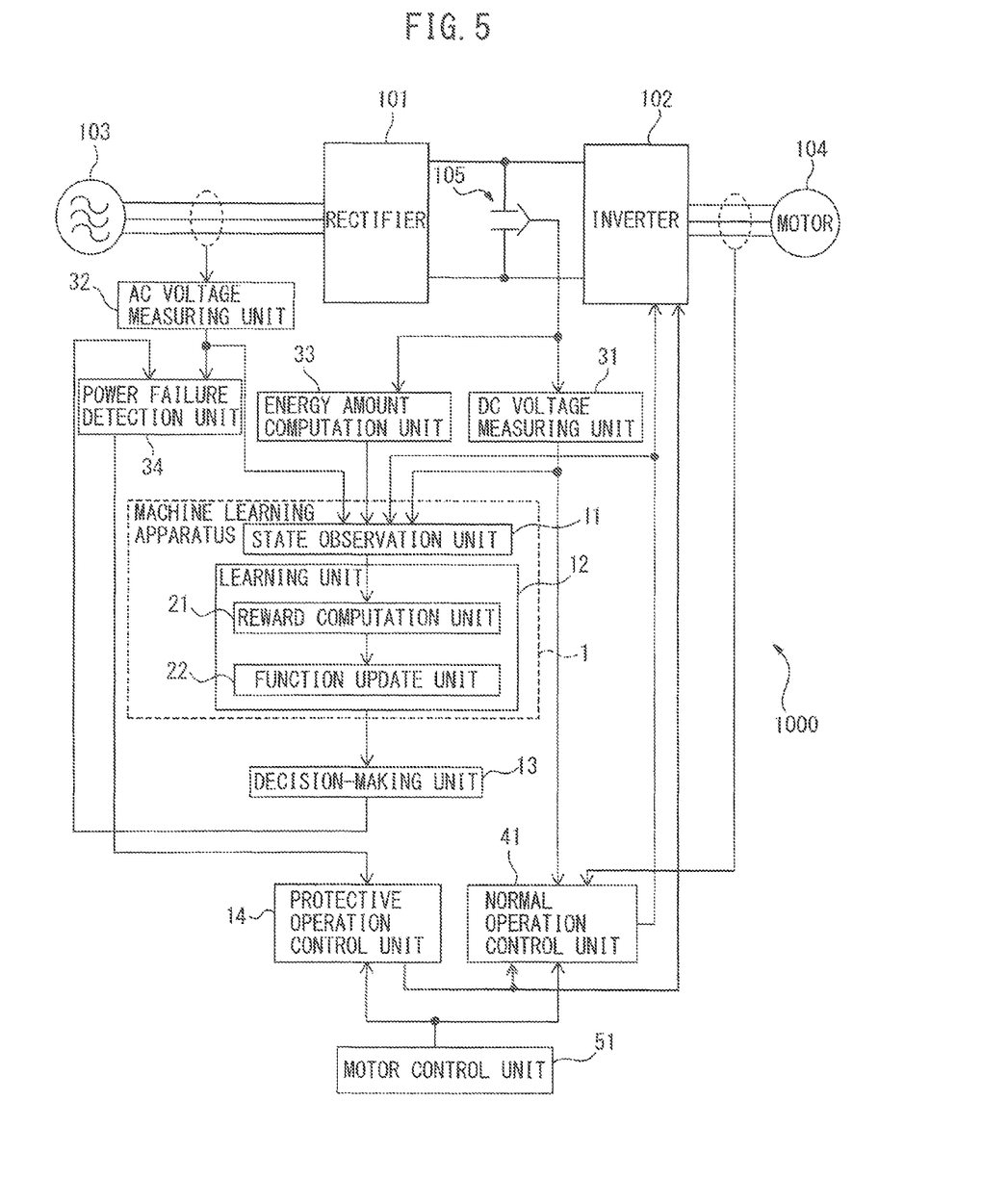
FIG. 5 is a principle block diagram illustrating a motor control apparatus including the machine learning apparatus according to the embodiment.

FIG. 5 is a principle block diagram illustrating a motor control apparatus including the machine learning apparatus according to the embodiment. Although a motor control apparatus 1000 which controls driving of one motor 104 will be described herein, the number of motors 104 controlled in driving by the motor control apparatus 1000 does not particularly limit the present invention and may be more than one. The type of motor 104 driven by the motor control apparatus 1000 does not particularly limit the present invention either, and an induction motor or a synchronous motor, for example, may be used.

The number of phases does not particularly limit the present invention either, and not only a three-phase motor but also, e.g., a single-phase motor or a multi-phase motor other than a three-phase motor may be used.

The motor control apparatus 1000 includes, as its main circuit configuration, a rectifier 101, an inverter 102, and a DC link capacitor 105. The motor control apparatus 1000 has its three-phase AC input terminal connected to an AC power supply 103 and its AC motor-side terminal to a three-phase motor 104. For the sake of descriptive simplicity, FIG. 5 represents a control system for driving the motor 104, collectively as a normal operation control unit 41. FIG.

5 does not illustrate an initial charging means used to raise the DC link voltage from 0 [V] to an input voltage peak value.

The rectifier 101 converts AC power supplied from the AC power supply 103 into DC power and outputs the DC power to a DC link. According to the present invention, the embodiment of the rectifier 101 used is not particularly limited. Examples of the rectifier 101 may include a diode rectifier and a PWM-controlled rectifying circuit.

The DC link capacitor 105 is provided in the DC link that connects the DC terminal of the rectifier 101 to that of the inverter 102. The DC link capacitor 105 has a function for storing DC power in the DC link and a smoothing function for suppressing pulsation of the DC output of the rectifier 101.

The inverter 102 is connected to the DC link to convert the DC power in the DC link into AC power and supply the AC power to the motor 104. In general, however, the inverter 102 serves as a power converter which allows bidirectional AC/DC conversion. In other words, the inverter 102 allows bidirectional power conversion between DC power in the DC link and AC power serving as drive power or regenerative power for the motor 104. In response to a motor driving command received from the normal operation control unit 41, the inverter 102 performs a motoring operation (inversion operation) for converting DC power into AC power or a regeneration operation (conversion operation) for converting AC power into DC power. More specifically, based on a motor driving command received from the normal operation control unit 41, the inverter 102 causes its internal switching element to convert, by switching, DC power supplied from the DC link into three-phase AC power having desired voltages and frequencies for driving the motor 104. The motor 104 thus operates based on the variable-voltage and -frequency three-phase AC power supplied. Regenerative power is generated upon deceleration of the motor 104. In this case, AC regenerative power generated by the motor 104 is converted into DC power and the DC power is returned to the DC link, based on a motor driving command received from the normal operation control unit 41. When a plurality of motors 104 are controlled in driving by the motor control apparatus 1000, a parallel circuit consisting of inverters 102 equal in number to the motors 104 is formed to independently supply drive power to each motor 104 to control driving of the motors 104. The inverter 102 is implemented in a bridge circuit consisting of a switching element and a diode connected in inverse parallel to it, such as a PWM inverter. Examples of the switching element may include an IGBT, a thyristor, a GTO (Gate Turn-Off thyristor), and a transistor. However, the type of switching element itself does not particularly limit the present invention and other types of semiconductor elements may be employed.

The motor control apparatus 1000 includes, as its control system, the machine learning apparatus 1 using reinforcement learning described with reference to FIGS. 3 and 4, a decision-making unit 13, a protective operation control unit 14, a DC voltage measuring unit 31, an AC voltage measuring unit 32, an energy amount computation unit 33, a power failure detection unit 34, a normal operation control unit 41, and a motor control unit 51.

The DC voltage measuring unit 31 measures the voltage (DC link voltage) across the two terminals of the DC link capacitor 105 provided in the DC link.

The AC voltage measuring unit 32 measures the power supply voltage on the side of the AC power supply 103.

The energy amount computation unit 33 computes the amount of energy stored in the DC link capacitor 105.

The power failure detection unit 34 determines that power failure has occurred on the AC power supply side when the power supply voltage on the side of the AC power supply 103 has been lower than the power failure detection level for the power failure detection time. The power failure detection level and the power failure detection time used for power failure detection processing by the power failure detection unit 34 are decided by the decision-making unit 13, as will be described later.

When the power failure detection unit 34 detects power failure on the side of the AC power supply 103, the protective operation control unit 14 outputs a protective operation command to the inverter 102 to output power for performing a predetermined protective operation by the motor 104. When the inverter 102 serves as a PWM-controlled inverter, a protective operation command is generated as a PWM control signal for PWM switching control of the switching element in the inverter 102. Although the protective operation control unit 14 directly outputs a protective operation command to the inverter 102 in this embodiment, a protective operation command may be output to the normal operation control unit 41 as an alternative. In the latter case, in response to a protective operation command from the protective operation control unit 14, the normal operation control unit 41 outputs a driving command to the inverter 102 to output power for performing a predetermined protective operation by the motor 104. In either case, in response to a protective operation command, the inverter 102 converts the DC power stored in the DC link capacitor 105 into AC power preferably used for various protective operations for protecting, e.g., a tool connected to the motor 104, an object to be processed by the tool, and a manufacturing line including the motor control apparatus 1000, and outputs the AC power.

The normal operation control unit 41 controls the power conversion operation of the inverter 102 that performs conversion between DC power in the DC link and AC power on the side of the AC motor 104. In other words, the normal operation control unit 41 issues a command to the inverter 102 to perform a regeneration operation (conversion operation) for converting AC power into DC power or a motoring operation (inversion operation) for converting DC power into AC power, as a driving command for controlling the velocity, torque, or rotor position of the motor 104, using, e.g., an operation program for the motor 104, the AC current or voltage on the AC motor side of the inverter 102, and/or the rotational speed of the motor 104. When the inverter 102 serves as a PWM-controlled inverter, each of the above-mentioned commands is generated as a PWM control signal for PWM switching control of the switching element in the inverter 102.

The machine learning apparatus 1 includes a state observation unit 11 and a learning unit 12.

The state observation unit 11 observes a state variable including at least one of data associated with the value of a power supply voltage on the side of the AC power supply 103, data associated with the amount of energy stored in the DC link capacitor 105 provided in the DC link, data indicating whether a protective operation for the motor control apparatus 1000 by the protective operation control unit 14 is successful, and data associated with motor output. The observed state variable is used for learning in the learning unit 12 as a training data set. The power supply voltage on the side of the AC power supply 103 is measured by the AC voltage measuring unit 32, and the amount of energy stored in the DC link capacitor 105 is computed by the energy amount computation unit 33.

The reward computation unit 21 in the learning unit 12 computes a reward based on the state variable observed by the state observation unit 11.

Assume that the amount of energy stored in the DC link capacitor 105 is defined as a state variable. Then, the reward computation unit 21 increases the reward when the amount of energy stored in the DC link capacitor 105 and observed by the state observation unit 11 is smaller than a predetermined value; otherwise, the reward computation unit 21 reduces the reward. Again, when the amount of energy stored in the DC link capacitor 105 is smaller than a predetermined value, the reward is increased; otherwise, the reward is reduced. This is done for the following reason: the fact that the energy stored in the DC link capacitor 105 remains in an amount equal to or larger than a predetermined value upon the completion of a protective operation by the protective operation control unit 14 when power failure has occurred on the side of the AC power supply 103 means that power for normally operating the motor control apparatus 1000 without the execution of a protective operation still remains and the power failure detection level and the power failure detection time have been set too strict.

When data indicating whether a protective operation for the motor control apparatus 1000 is successful is defined as a state variable, the reward computation unit 21 reduces the reward when failure of the protective operation for the motor control apparatus 1000 is observed by the state observation unit 11. Again, the reward is reduced when failure of the protective operation for the motor control apparatus 1000 is observed. This is done for the following reason: failure of the protective operation leads to some type of trouble such as damage or deformation of, e.g., the motor 104, the motor control apparatus 1000 that drives the motor 104, a tool connected to the motor 104 driven by the motor control apparatus 1000, an object to be processed by the tool, or a manufacturing line including the motor control apparatus 1000.

The function update unit 22 in the learning unit 12 updates a function for changing the power failure detection level and the power failure detection time, based on the reward computed by the reward computation unit 21. In, e.g., Q-learning, the action value function Q(s, a) presented in expression (1) is used as a function for changing the power failure detection level and the power failure detection time.

The decision-making unit 13 decides the power failure detection level and the power failure detection time in response to input of the current state variable, based on the result of learning by the learning unit 12 in accordance with the training data set. In this embodiment, reinforcement learning is used as an exemplary learning algorithm. The function update unit 22 in the learning unit 12 updates a function for changing the power failure detection level and the power failure detection time, based on the reward computed by the reward computation unit 21 in the learning unit 12. The decision-making unit 13 selects a power failure detection level and a power failure detection time which achieve the greatest reward, based on the updated function. The power failure detection unit 34 determines whether power failure has occurred on the side of the AC power supply 103, based on the power failure detection level and the power failure detection time decided by the decision-making unit 13.

The motor control unit 51 controls the overall, protective operation control unit 14 and normal operation control unit 41.

Figure 6:
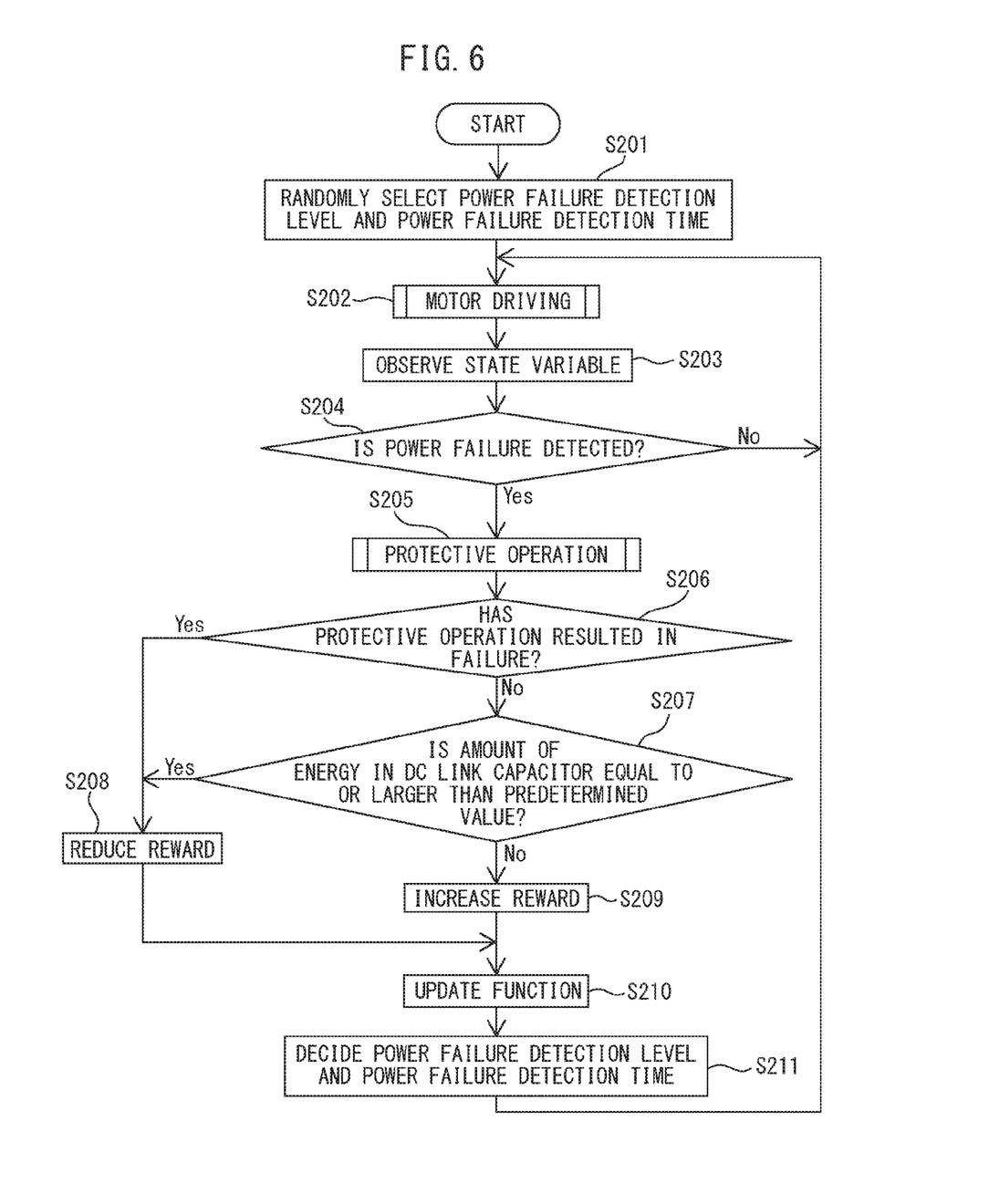
FIG. 6 is a flowchart illustrating the operation sequence of the machine learning apparatus using reinforcement learning according to the embodiment.

FIG. 6 is a flowchart illustrating the operation sequence of the machine learning apparatus using reinforcement learning according to the embodiment.

In general, an initial value for the action is randomly selected in reinforcement learning. In this embodiment, in step S201, initial values for the power failure detection level and the power failure detection time defined as actions are randomly selected.

In step S202, the normal operation control unit 41 issues a command to the inverter 102 to perform a regeneration operation (conversion operation) for converting AC power into DC power or a motoring operation (inversion operation) for converting DC power into AC power, as a driving command for controlling the velocity, torque, or rotor position of the motor 104, using, e.g., an operation program for the motor 104, the AC current or voltage on the AC motor side of the inverter 102, and/or the rotational speed of the motor 104. The motor 104 thus performs an acceleration, constant-speed, or deceleration operation. During this time, the DC voltage measuring unit 31 measures the voltage (DC link voltage) across the two terminals of the DC link capacitor 105 provided in the DC link, the AC voltage measuring unit 32 measures the power supply voltage on the side of the AC power supply 103, and the energy amount computation unit 33 computes the amount of energy stored in the DC link capacitor 105.

In step S203, the state observation unit 11 observes, as a training data set, a state variable including at least one of data associated with the value of a power supply voltage on the side of the AC power supply 103, data associated with the amount of energy stored in the DC link capacitor 105 provided in the DC link, data indicating whether a protective operation for the motor control apparatus 1000 by the protective operation control unit 14 is successful, and data associated with motor output. Although these three pieces of data are defined as state variables as an example in this embodiment, it suffices to define at least one of them as a state variable.

In step S204, the power failure detection unit 34 determines whether power failure has occurred on the side of the AC power supply 103, based on the power failure detection level and the power failure detection time, as well as the power supply voltage on the side of the AC power supply 103 measured by the AC voltage measuring unit 32. When the power supply voltage on the side of the AC power supply 103 has been lower than the power failure detection level for the power failure detection time, the power failure detection unit 34 determines that power failure has occurred on the AC power supply side, and advances the process to step S205.

In step S205, when power failure on the side of the AC power supply 103 is detected by the power failure detection unit 34, the protective operation control unit 14 outputs a protective operation command to the inverter 102 to output power for performing a predetermined protective operation by the motor 104. Upon this operation, the inverter 102 converts the DC power stored in the DC link capacitor 105 into AC power preferably used for various protective operations for protecting, e.g., a tool connected to the motor 104, an object to be processed by the tool, and a manufacturing line including the motor control apparatus 1000, and outputs the AC power.

In step S206, the state observation unit 11 determines whether a protective operation for the motor control apparatus 1000 has resulted in failure, based on the data indicating whether a protective operation is successful. When failure of the protective operation for the motor control apparatus 1000 is observed by the state observation unit 11, the reward computation unit 21 reduces the reward in step S208. When success of the protective operation for the motor control apparatus 1000 is observed by the state observation unit 11, the process advances to step S207.

In step S207, the state observation unit 11 determines whether the amount of energy stored in the DC link capacitor 105 and observed by the state observation unit 11 is equal to or larger than a predetermined value, based on the data associated with the amount of energy stored in the DC link capacitor 105. When the state observation unit 11 determines that the amount of energy stored in the DC link capacitor 105 is equal to or larger than the predetermined value, the reward computation unit 21 reduces the reward in step S208. The reward computation unit 21 increases the reward in step S209 when the state observation unit 11 determines that the amount of energy stored in the DC link capacitor 105 is smaller than the predetermined value.

In step S210, the function update unit 22 updates a function for changing the power failure detection level and the power failure detection time, based on the reward computed by the reward computation unit 21.

In next step S211, the decision-making unit 13 selects a power failure detection level and a power failure detection time which achieve the greatest reward, based on the function updated in step S210. The process then returns to step S202, in which the processes in steps S202 to S211 are iterated thereafter. With this operation, the machine learning apparatus 1 learns a power failure detection level and a power failure detection time as conditions which are associated with power failure on the AC power supply side and can maximally continue normal operation to minimize the execution of a protective operation. Training data sets may be obtained from a plurality of rectifiers 101. In this case, the learning unit 12 iterates the processes in steps S201 to S211 in accordance with the training data sets obtained for the plurality of rectifiers 101, to learn the power failure detection level and the power failure detection time. Obtaining training data sets for the plurality of rectifiers 101 improves the learning accuracy of the machine learning apparatus 1.

The state observation unit 11, the learning unit 12, and the decision-making unit 13 described above may be constructed in, e.g., the software program form or constructed by a combination of various electronic circuits and software programs. When, for example, these units are constructed in the software program form, the function of each of the above-mentioned units is implemented by operating the arithmetic processing unit in the motor control apparatus 1000 in accordance with the software program. Alternatively, the machine learning apparatus 1 including the state observation unit 11 and the learning unit 12 may be implemented as a semiconductor integrated circuit in which a software program for implementing the function of each unit is written. Or again, a semiconductor integrated circuit in which a software program for implementing the function of each unit is written may be implemented to include the decision-making unit 13, as well as the machine learning apparatus 1 including the state observation unit 11 and the learning unit 12.

Machine learning processing is performed using various types of data measured by the DC voltage measuring unit 31 and the AC voltage measuring unit 32 intrinsically mounted in the motor control apparatus 1000 to control driving of a motor. This involves no new hardware device as in the conventional technique. This configuration is, therefore, also applicable to an existing motor control apparatus by retrofitting. In this case, it suffices to equip the existing motor control apparatus with a semiconductor integrated circuit in which a software program for implementing the function of each unit including the machine learning apparatus 1 and the decision-making unit 13 is written, or to additionally install on the arithmetic processing unit in the existing motor control apparatus, a software program for implementing the function of each unit including the machine learning apparatus 1 and the decision-making unit 13. Further, a machine learning apparatus 1 having learned the power failure detection level and the power failure detection time for one motor control apparatus may be mounted in another motor control apparatus to re-learn and update the power failure detection level and the power failure detection time for the other motor control apparatus.

The present invention attains a motor control apparatus which can maximally continue normal operation upon power failure on the AC power supply side to minimize the execution of a protective operation, and a machine learning apparatus and method used for the motor control apparatus.

According to the present invention, for an operating motor control apparatus, a machine learning apparatus itself adjusts a power failure detection level and a power failure detection time which can maximally continue normal operation upon power failure on the AC power supply side to minimize the execution of a protective operation. This does not involve adjustment by a human in the design or operation stage of the motor control apparatus.

What is claimed is:
1. A machine learning apparatus for learning (i) a power failure detection level, which is a value of a power supply voltage defined as a criterion for determination as to whether power failure has occurred on an AC power supply side of a motor control apparatus, and (ii) a power failure detection time, which is a time for which the power supply voltage on the AC power supply side of the motor control apparatus has been lower than the power failure detection level, in the motor control apparatus which converts AC power supplied from the AC power supply side into DC power, outputs the DC power to a DC link, further converts the DC power into AC power for driving a motor, and supplies the AC power to the motor, the machine learning apparatus comprising:
a DC voltage measuring unit which measures a DC link voltage across two terminals of a DC link capacitor in the DC link;
an AC voltage measuring unit which measures a value of the power supply voltage on the AC power supply side;
an energy amount computation unit which computes an amount of energy stored in the DC link capacitor;
a state observation unit which observes a state variable including
data associated with the measured value of the power supply voltage on the AC power supply side,
data associated with the computed amount of energy stored in the DC link capacitor,
data indicating whether a protective operation for the motor control apparatus is successful, and
data associated with motor output; and
a learning unit which learns the power failure detection level and the power failure detection time, by repeating update of a function for changing the power failure detection level and the power failure detection time, based on the state variable.

2. The machine learning apparatus according to claim 1, wherein the learning unit is configured to learn the power failure detection level and the power failure detection time, based on state variables obtained for a plurality of motor control apparatuses.

3. A motor control apparatus comprising the machine learning apparatus according to claim 1, the motor control apparatus further comprising:
- a decision-making unit which decides the power failure detection level and the power failure detection time in response to input of a current state variable of the state variable, based on a result of learning by the learning unit;
- a rectifier which converts AC power supplied from the AC power supply into DC power and outputs the DC power to the DC link;
- an inverter which is connected to the DC link, converts the DC power in the DC link into AC power, and supplies the AC power to the motor;
- a power failure detection unit which determines that power failure has occurred on the AC power supply side when the power supply voltage on the AC power supply side has been lower than the power failure detection level for the power failure detection time; and
- a protective operation control unit which outputs a protective operation command to the inverter to output power for performing a predetermined protective operation by the motor, when the power failure detection unit detects power failure on the AC power supply side.

4. The motor control apparatus according to claim 3, wherein the learning unit is configured to re-learn and update the power failure detection level and the power failure detection time, based on the state variable.

5. A machine learning apparatus for learning (i) a power failure detection level, which is a value of a power supply voltage defined as a criterion for determination as to whether power failure has occurred on an AC power supply side of a motor control apparatus, and (ii) a power failure detection time, which is a time for which the power supply voltage on the AC power supply side of the motor control apparatus has been lower than the power failure detection level, in the motor control apparatus which converts AC power supplied from the AC power supply side into DC power, outputs the DC power to a DC link, further converts the DC power into AC power for driving a motor, and supplies the AC power to the motor,
the machine learning apparatus comprising:
- a state observation unit which observes a state variable including data associated with a value of the power supply voltage on the AC power supply side, data associated with an amount of energy stored in a DC link capacitor provided in the DC link, data indicating whether a protective operation for the motor control apparatus is successful, and data associated with motor output; and
- a learning unit which learns the power failure detection level and the power failure detection time, by repeating update of a function for changing the power failure detection level and the power failure detection time, based on the state variable, wherein
the learning unit comprises:
- a reward computation unit which computes a reward for the result of changing the power failure detection level and the power failure detection time, based on the state variable; and
- a function update unit which updates, based on the reward, the function, and
the learning unit learns the power failure detection level and the power failure detection time which achieve the greatest reward, by repeating update of the function by the function update unit.

6. The machine learning apparatus according to claim 5, wherein the reward computation unit increases the reward when the amount of energy stored in the DC link capacitor and observed by the state observation unit is smaller than a predetermined value, and the reward computation unit reduces the reward when the amount of energy stored in the DC link capacitor and observed by the state observation unit is not less than the predetermined value.

7. The machine learning apparatus according to claim 5, wherein the reward computation unit reduces the reward when failure of the protective operation for the motor control apparatus is observed by the state observation unit.

8. A machine learning method for learning (i) a power failure detection level, which is a value of a power supply voltage defined as a criterion for determination as to whether power failure has occurred on an AC power supply side of a motor control apparatus, and (ii) a power failure detection time, which is a time for which the power supply voltage on the AC power supply side of the motor control apparatus has been lower than the power failure detection level, in the motor control apparatus which converts AC power supplied from the AC power supply side into DC power, outputs the DC power to a DC link, further converts the DC power into AC power for driving a motor, and supplies the AC power to the motor,
the method comprising:
- a state observation step of observing a state variable including data associated with a value of the power supply voltage on the AC power supply side, data associated with an amount of energy stored in a DC link capacitor provided in the DC link, data indicating whether a protective operation for the motor control apparatus is successful, and data associated with motor output; and
- a learning step of learning the power failure detection level and the power failure detection time, by repeating update of a function for changing the power failure detection level and the power failure detection time, based on the state variable, wherein
the learning step comprises:
- a reward computation step of computing a reward for the result of changing the power failure detection level and the power failure detection time, based on the state variable, and
- a function update step of updating, based on the reward, the function, and
the learning step comprises learning the power failure detection level and the power failure detection time which achieve the greatest reward, by repeating update of the function in the function update step.

* * * * *